(12) United States Patent
Hiltunen

(10) Patent No.: US 6,858,130 B2
(45) Date of Patent: Feb. 22, 2005

(54) METHOD AND APPARATUS FOR SEPARATING SOLIDS FROM A GASEOUS PHASE

(75) Inventor: Jyrki Hiltunen, Sipoo (FI)

(73) Assignee: Fortum Oil Oy, Fortum (FI)

(*) Notice: Subject to any disclaimer, the term of this patent is extended or adjusted under 35 U.S.C. 154(b) by 0 days.

(21) Appl. No.: 09/778,922

(22) Filed: Feb. 8, 2001

(65) Prior Publication Data

US 2002/0033098 A1 Mar. 21, 2002

(30) Foreign Application Priority Data

Feb. 8, 2000 (FI) .............................................. 20000262

(51) Int. Cl.[7] .......................... C10G 11/00; F27B 15/12; B01D 45/12
(52) U.S. Cl. ........................ 208/161; 208/113; 422/147; 95/271; 55/343; 55/345; 55/346; 55/348; 209/711
(58) Field of Search ................................. 208/161, 113; 422/147; 95/271; 55/343, 345, 346, 348; 209/711

(56) References Cited

U.S. PATENT DOCUMENTS

| | | | | |
|---|---|---|---|---|
| 2,337,684 A | * | 12/1943 | Scheineman | ............... 159/4.07 |
| 2,360,355 A | * | 10/1944 | McBride et al. | ............ 209/712 |
| 2,498,832 A | * | 2/1950 | Watson et al. | .............. 209/712 |
| 2,515,155 A | * | 7/1950 | Munday | ..................... 208/161 |
| 2,553,175 A | * | 5/1951 | Davenport et al. | ......... 208/161 |
| 2,874,801 A | | 2/1959 | Van Der Kolk | |
| 3,969,096 A | * | 7/1976 | Richard | ....................... 55/455 |
| 4,863,500 A | * | 9/1989 | Rombout et al. | |
| 5,538,696 A | | 7/1996 | Raterman et al. | |
| 6,022,390 A | * | 2/2000 | Jakkula | ..................... 208/161 |

FOREIGN PATENT DOCUMENTS

| | | |
|---|---|---|
| DE | 914701 C | 7/1954 |
| DE | 1146338 B | 3/1963 |
| DE | 4212270 A1 * | 10/1993 |
| EP | 0 581 977 A1 | 2/1994 |
| GB | 1526509 | 9/1978 |
| GB | 1592051 | 7/1981 |
| WO | WO925469 | 5/1999 |

* cited by examiner

Primary Examiner—Walter D. Griffin
(74) Attorney, Agent, or Firm—Birch, Stewart, Kolasch & Birch, LLP

(57) ABSTRACT

The present invention relates to a method and apparatus for separating particulate matter from a gaseous stream. According to the method, the gaseous stream containing the suspended particulates is passed into a separator apparatus which includes at least two multiple-inlet-multicyclones (16–16C), wherein the particulates are separated from the gas by centrifugal force. According to the invention, a separator apparatus is employed wherein at least two (16–16C) of the multiple-inlet cyclones are adapted to operate in parallel so as to form a multiple-inlet-multicyclone apparatus. The cyclone assembly according to the invention may be used as, e.g., the primary separator of an FCC unit, but more advantageously it serves as the secondary or tertiary separator of an FCC unit to remove "fines" from the flue gases of the preceding separation stages.

19 Claims, 3 Drawing Sheets

Conventional Cyclone

METHOD AND APPARATUS FOR SEPARATING SOLIDS FROM A GASEOUS PHASE

The invention relates to a method for separation of solids from gases.

According to the present method, a gaseous flow carrying solids is passed into a separator apparatus comprising a separation unit formed by at least two multiple-inlet cyclones, wherein the solids are separated from the gaseous phase under the effect of centrifugal force.

The invention also relates to a cyclone apparatus comprising an assembly formed by at least two multiple-inlet cyclones.

The method and apparatus according to the invention are particularly suited for use in conjunction with processes pertaining to the treatment of hydrocarbons. These processes include, e.g., catalytic and thermal cracking, dehydrogenation, Fischer-Tropsch synthesis, manufacture of maleic acid anhydride and oxidizing dimerization of methane. In addition to these, however, the invention is generally applicable to the separation of solids from a gaseous flow. Accordingly, another major area of application can be appreciated in the generation of thermal and electrical energy, wherein the disclosed technique is particularly suited for use in conjunction with solid-fuel-fired boilers.

Hydrocarbon conversion processes are conventionally run using fixed-bed reactors and fluidized-bed reactors (fluidized catalytic reactors). In the present context, the term "fluidized catalytic process apparatus" is used to refer to apparatuses used in processes having a fine-grained pulverized catalyst suspended, e.g., in a slowly upward rising gaseous flow, wherein the catalyst promotes desired reactions.

One of the most widely employed fluidized-catalyst reactor systems in the art is the FCC apparatus, that is, fluidized-catalyst cracking apparatus, generally comprising as its main components a tubular riser operated in the fast-fluidization flow phase, a large-volume reactor operated in a diluted suspension phase and a regenerator operated in the fluidized-bed phase.

In an FCC unit, the riser and the large-volume reactor deliver a gaseous flow of suspended solids, whose particulate matter and product gas are separated from each other in cyclones whose function is based on centrifugal force. Typically, the gaseous flow is passed through a train of multiple cyclones in order to improve the overall separation efficiency, because single cyclones of normal construction exhibit inferior separation performance for particles smaller than 15 $\mu$m.

Cyclone separators have either a coiled or spiraled structure in which the particulate matter suspension is directed as a tangential flow into the cylindrical section of the cyclone, whereby the catalyst particles are driven close to the interior wall thus becoming separated from the gas by centrifugal force when the flow swirls typically 7–9 revolutions within the cylindrical section of the cyclone and then in the conical section forming a continuation thereof. Also axial-flow cyclones are known in which the gas stream flowing through a tube is forced into a circulating motion by means of vanes, whereby the solids by centrifugal force are driven against the tube wall thus becoming separated from the gas stream.

Axial-flow cyclones are described in patent publications GB 1,592,051 and GB 1,526,509. As disclosed in cited publications, an axial-flow cyclone comprises a tubular cyclone chamber having an inlet opening at the first end thereof for the gas stream to be treated and an outlet opening at the other end thereof for the treated gas. This kind of cyclone is proposed for use in conjunction with internal combustion, diesel and jet propulsion engines, turbines and the like equipment that need clean intake air.

More stringent regulations on clean air environment and improved efficiency in energy use through reduced pressure of FCC regeneration gas at turbines put increasingly tighter requirements on dust concentration in FCC apparatuses. While the separation efficiency can be improved through making the cyclone diameter smaller, it also respectively necessitates the use of a greater number of cyclones.

A problem in energy production is caused to electrostatic precipitators inasmuch the flue gases often contain substantial amounts of noncombusted components that soil electrostatic precipitators and put extra load on their operation. With the help of a higher efficiency in cyclone separation, these components could be recycled to the combustion process, thus improving the efficiency of the boiler. In certain instances, it would even be possible run a system without any electrostatic precipitator at all.

In addition to the insufficient separation efficiency, conventional FCC apparatuses have been hampered, among other problems, by erosion of the catalyst and the circulating solids, as well as of the internal structures. In most cases, these problems occur in the separation cyclones that purify the gaseous phase free from solids and the catalyst thus forming an essential part of a complete system. To prevent such erosion, conventional cyclone structures must be internally protected by a ceramic lining. The erosion-related problems become more severe in small-diameter cyclones.

It is an object of the present invention to overcome the above-described disadvantages of the prior art and to provide a novel technique of separating solids from the gaseous phase.

The goal of the invention is attained by way of implementing a cyclone apparatus as a unit comprising a plurality of parallel-connected multiple-inlet cyclones. Unexpectedly, it has been found that the separation efficiency of a cyclone unit can be improved hereby without encountering a significant increase in the erosion rate of the equipment.

Accordingly, a cyclone apparatus according to the invention comprises at least two multiple-inlet cyclones connected in parallel. Each one of the cyclones has an inlet conduit for the gaseous stream of entrained solids to be treated and, connected to the inlet conduit, a separation chamber having an essentially upright aligned center axis and at least two guide vanes that force the gaseous stream into an essentially tangential flow in the separation chamber to accomplish the separation of solids from the gaseous phase. To the lower portion of the cyclone separation chamber is connected a dipleg for the separated solids and a center conduit aligned parallel to the separation chamber center axis for the discharge of the gaseous phase separated free from the solids. The cyclones are operated in parallel by way of connecting the inlet conduits of the multiple-inlet cyclones to each other and, respectively, the diplegs of the cyclones to a common discharge conduit.

While the cyclone apparatus according to the invention can be used as, e.g., the primary separation stage of an FCC unit, the most advantageous application thereof is as the secondary or tertiary separation stage of an FCC unit for the separation of the finest fraction of particulate matter in the flue gases of preceding separation stages.

More specifically, the method according to the invention is characterized by what is stated in the claims.

Furthermore, the cyclone apparatus according to the invention is characterized by what is stated in the claims.

The present invention provides significant benefits. For instance, shear stresses that initiate corrosion are smaller in the multiple-inlet-multicyclone apparatus according to the invention than those occurring a conventional multicyclone apparatus based on, e.g., axial-flow cyclones. Nevertheless, a multicyclone apparatus implemented using multiple-inlet cyclones offers a separation efficiency higher than that of a multicyclone apparatus which is constructed using axial-flow cyclones, yet having an essentially equal figure of construction costs. In an axial-flow cyclone, the flow rate of the solids-carrying gaseous stream cannot be accelerated in the flow passageway as would be advantageous for a higher separation efficiency. In contrast, a multiple-inlet cyclone typically is provided with straight guide vanes serving to divide the main stream into substreams, each of which may be effectively accelerated to a higher velocity. Straight guide vanes are less subject to wear than curved vanes, because the former type of vanes do not have to deflect the direction of the gaseous stream, but only to increase the flow rate thereof. Due to the smaller solids content, the erosion wear rate of the apparatus walls is reduced to a minimum. Simultaneously, the attrition of the solid particles is reduced which means that a smaller amount of "fines" is generated during the separation process.

A multiple-inlet-multicyclone apparatus can perform particularly effectively as a secondary or tertiary separation unit inasmuch the gaseous stream is directed close to the inner wall of the separation chamber by means of the above-mentioned vanes. Hence, an apparatus according to the invention can achieve the separation of extremely small particles, especially those mentioned above to have a size smaller than 15 μm, from the flue gases in a fashion of superior efficiency over the prior art, whereby an FCC apparatus can be adapted in a particularly cost-efficient manner to comply with the tightening requirements on a smaller dust concentration in the operation of an FCC apparatus. A competing technology is represented by the electrostatic precipitator which is generally employed in energy production, but is a substantially costlier choice as to its investment costs, footprint requirement and operating costs.

In conjunction with solid-fuel fired boilers used in energy production, a multiple-inlet-multicyclone apparatus may be employed particularly in front of an electrostatic precipitator to remove noncombusted components of the flue gases in a more efficient fashion than that offered by the prior art so as to replace an electrostatic precipitator in certain instances.

When used for separating conventional FCC catalysts, the multiple-inlet, multicyclone apparatus according to the invention can render a discharge gas dust concentration as low as 50 mg/Nm$^3$ when the apparatus is used as a secondary or tertiary separator.

Next, the invention will be examined closer with the help of a detailed description by making reference to the appended drawings in which.

Figure 1:
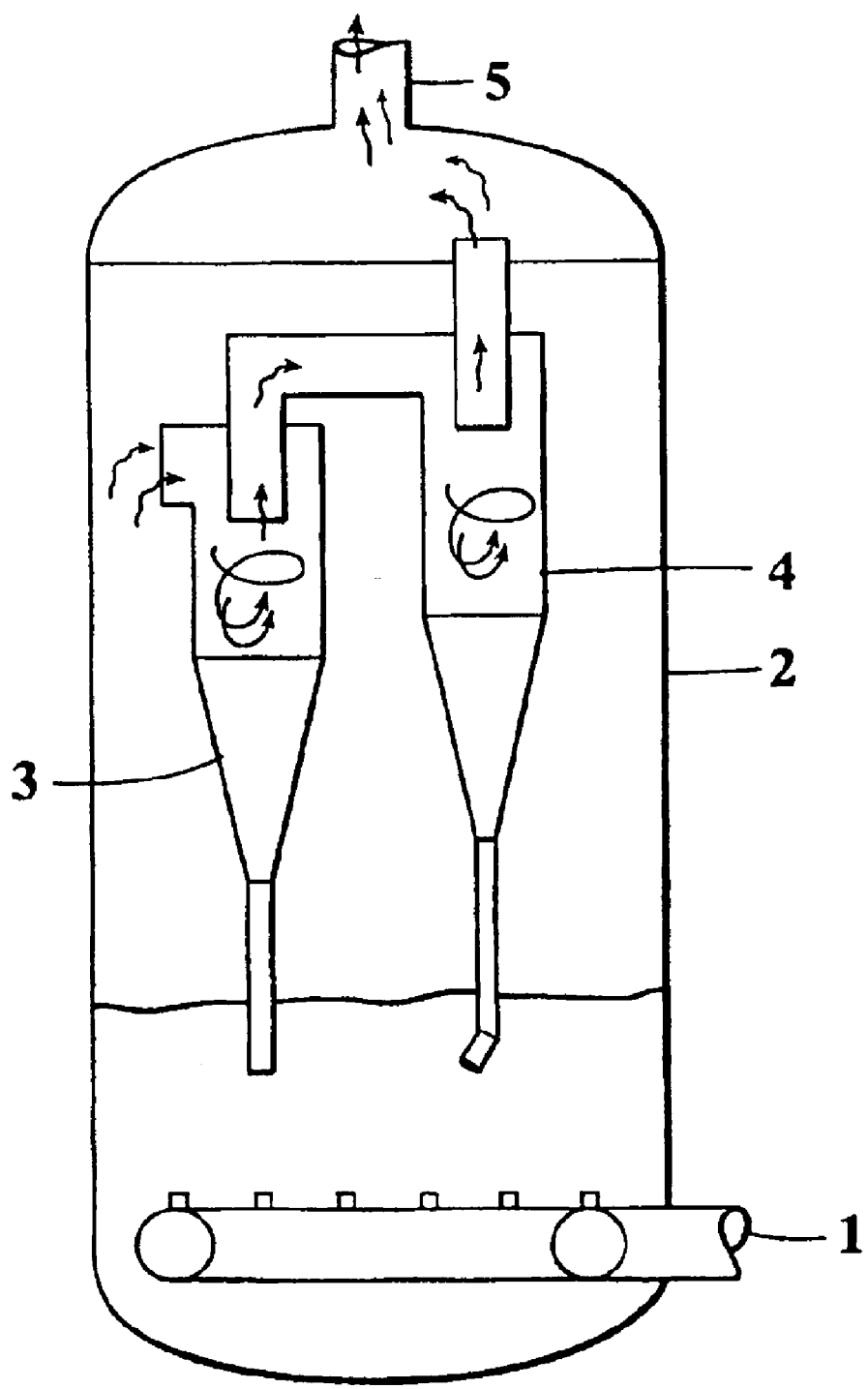
FIG. 1 shows a schematic layout of a conventional cyclone construction.

The construction of a multiple-inlet cyclone is well known in the art and is described, e.g., in U.S. Pat. No. 3,969,096. Commonly, a multiple-inlet cyclone refers to a cyclone, whose separation chamber comprises at least two inlet openings and wherein the separation of solids from the gas is accomplished at least partly by a centrifugal force by directing the gas stream tangentially along the wall of the separation chamber. Cascade connections formed by a plurality of multiple-inlet cyclones are also well known. As to the state of the art in this sector, reference is made to PCT patent application publication WO 99/25469 disclosing an arrangement proposed by the applicant. Therein is explained how the overall separation efficiency may be substantially improved by way of connecting a plurality of multiple-inlet cyclones in series. A further benefit in the disclosed arrangement is that it offers significant savings in factory footprint through constructing a cascaded separation unit from multiple-inlet cyclones inasmuch such cyclones may be placed into one another in a coaxial manner. It must be noted, however, that cited patent application publication WO 99/25469 does not include any consideration on a possible parallel connection of multiple-inlet cyclones nor any discussion on the possibilities of improving therethrough the separation efficiency of a combination cyclone apparatus without causing heavier erosion/attrition.

Multicyclones comprising parallel axial cyclones is known from the U.S. Pat. No. 4,863,500, the SE patent specification 346,706 as well as from the DE patent specifications 849,507, 914,701 and 1,146,338. However, none of these disclose a solution, wherein the parallel cyclones of the multicyclones are multi-inlet cyclones, wherein the separation is accomplished as in the present invention by directing the gas flow in the separation chamber to essentially a tangentially stream along the wall of the separation chamber. For instance the DE patent specification 914,701 a cyclone apparatus is disclosed, in whose cyclones there are interior guide vanes of the separation chamber. These vanes cause turbulence and flowing disturbance within the separation chamber and prevent a tangential stream against the wall.

The separation unit, or multiple-inlet-multicyclone apparatus, employed in the invention has two, most advantageously at least three, advantageously 3 to 300, particularly advantageously 3 to 25 multiple-inlet cyclones connected in parallel. In the context of the present invention, the term parallel connection is used when reference is made to a configuration, wherein each cyclone is connected to a common inlet pipe and a common discharge pipe. In the apparatus, the most important part thereof is its separation chamber having an at least essentially upright aligned center axis and an at least essentially circular cross section of its inner wall, which means that the separation chamber is rotationally symmetrical about its center axis. In a multiple-inlet-multicyclone apparatus, all the cyclone separation chambers have their center axes aligned parallel or at least essentially parallel.

To the separation chamber is connected the inlet nozzle of gases to be treated. The inlet nozzle is generally disposed perpendicular to the center axis of the separation chamber and is provided with axially aligned, straight guide vanes (that is, the guide vanes are aligned parallel to the center axis of the apparatus). With the help of the guide vane system, the gas being treated can be directed to stream tangentially along the inner wall of the separation chamber to accomplish the separation of solids from the gaseous phase by centrifugal force. As mentioned above, there are straight guide vanes in the multi-inlet cyclones serving to divide the gaseous stream into substreams, each of which permit an accelerated gas flow velocity to be arranged individually. The division into substreams is accomplished by forming a passage between the guide vanes, which accelerates the flow and channel it as a thin jet onto the wall of the separation chamber, which again makes the separation of the solids more effective. The passage is thin, which practically means that its width is at the most 10% of the diameter of the separation chamber. Normally the width is 1–8% of said diameter. The length of the passage is about 0.5–20 times the width of the passage. The number of the guide vanes is at least 2, advantageously from 3 to 60 and most advantageously 8–32. The guide vanes of the cyclone are arranged in an annular fashion about the inner perimeter of the cyclone chamber, reaching partially or most advantageously entirely into the riser channel so as to form a louver comprising a plurality of parallel inlet channels (i.e. -passages) for the entering gas flow. The separation effectiveness is at its best, when the guide vanes are entirely outside the cyclone chamber as the cyclones reaching into the cyclone chamber cause turbulence and flowing disturbances in the cyclone chamber. Into the separation chamber is further adapted a center conduit for discharge of flue gases and a dipleg for removal of solids separated from the gaseous phase.

The common inlet channel of the multiple-inlet-multicyclone apparatus may be formed by a space defined by two concentric cylindrical or partially conical envelope surfaces that is further divided in the direction of its longitudinal axis into segmentally parallel flow channels by means of baffles. The segmentally parallel flow channels can be implemented by mounting longitudinally aligned radial baffles between the two coaxial, cylindrical envelope surfaces. Almost an equivalent result is obtained by constructing the inlet channel from a plurality of parallel infeed tubes mounted in a circular fashion in the cyclone vessel. A still another possible arrangement is to feed the gaseous stream into the vessel asymmetrically, e.g., via an inlet conduit adapted through the pressurized wall of the multicyclone vessel.

In comparison to axial-flow cyclones, the cyclone constructions according to the present invention are different, among other factors, by having the discharge of the gas cleaned in the cyclone arranged to take place from the cyclone via a single discharge conduit that is advantageously adapted to the upper portion of the cyclone chamber.

In the method according to the invention, multiple-inlet-multicyclone apparatuses can be used as a part of a multistage separation process. Hence, according a first preferred embodiment of the invention such separation process equipment comprises a primary separator that may be a conventional cyclone or, advantageously, a multiple-inlet cyclone, and a secondary separator, wherein the above-described multiple-inlet-multicyclone apparatus is used.

According to another embodiment of the invention, the separation process equipment comprises conventional primary and secondary separators, whereby the multiple-inlet-multicyclone is adapted to function as the tertiary separator. Alternatively, at least one of the primary and secondary separators is a multiple-inlet-multicyclone apparatus. In lieu of a conventional cyclone, also series- or parallel-connected cyclones may be used. Equally, a conventional multiple-inlet cyclone can be replaced according to the invention by a plurality of multiple-inlet cyclones connected in series. Herein, reference is made to the arrangement disclosed in the above-cited patent application publication WO 99/25469. Obviously, the multiple-inlet-multicyclone apparatuses according to the invention may be used in a greater number of successive separation stages, e.g., as both secondary and tertiary cyclones.

The above-outlined apparatus construction and process may be adapted to the separation of catalyst from the product gases of a fluidized catalytic cracking (FCC) process. Particularly advantageously, the multiple-inlet-multicyclone apparatus can be used for separating regenerated catalyst in the catalyst regenerator of an FCC unit from the flue gases of coke oxidation.

Other suitable fluidized catalytic processes are, among others: catalytic reforming, oxidizing dimerization of phthalic acid anhydride, maleic acid anhydride or methane, Fischer-Tropsch synthesis, chlorination and bromination of methane, ethane and other hydrocarbons, and conversion of methanol into olefins or gasoline.

The multiple-inlet-multicyclone(s) according to the invention is/are connected either directly to the riser of a fluidized catalytic reactor, thus accomplishing a preferred embodiment of the invention, or the inlet nozzle of the cyclone(s) is arranged to communicate with the gas-phase space of the fluidized catalytic reactor, as is the case in conventional arrangements.

Figure 2:
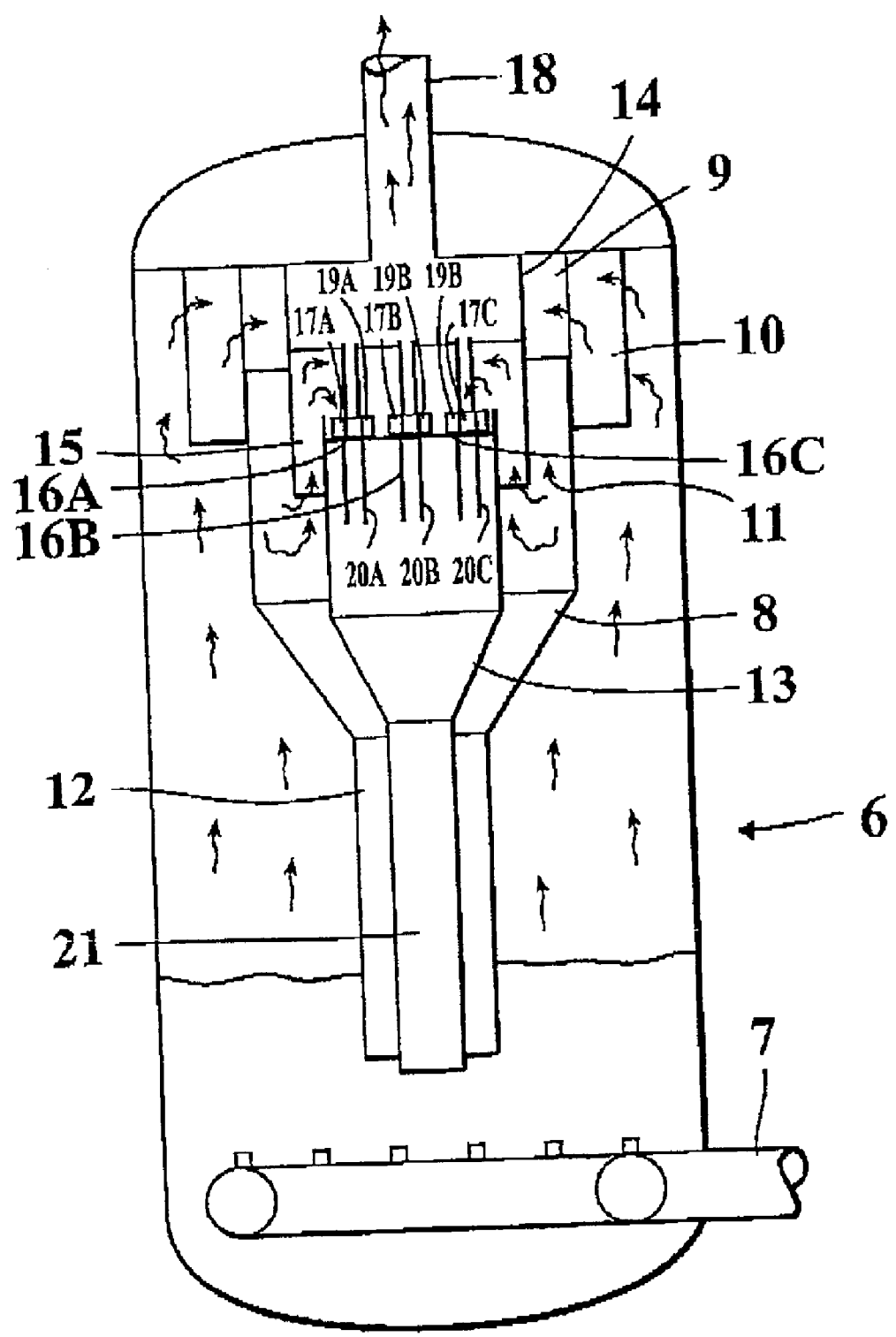
FIG. 2 shows a cyclone arrangement according to the invention having two cyclones (primary and secondary cyclone) in a series configuration connected to the regenerator of an FCC reactor.

In FIGS. 1 and 2 is first shown a conventional cyclone connection and then cyclone arrangement according to the invention, whereby the conventional configuration has two cyclones (a primary cyclone and a secondary cyclone) connected in series for use in the regenerator of an FCC unit. In practice, the number of series-connected cyclones may be varied so that a smaller or greater number than the two cyclones shown are used. As the maximum diameter of a conventional cyclone is about 1 m, more than one cyclone may be used in parallel depending on the amount of gas to be treated.

In a conventional cyclone construction, air passing through a diffuser 1 fluidizes the catalyst in the regenerator 2 into a bubbling-bed state and imports oxygen for the combustion reaction of coke. Next, the gaseous stream with the entrained catalyst particulates travel into a primary cyclone 3 located in the interior of the regenerator 2. The particulate matter separates from the gaseous phase onto the wall of the cyclone chamber and falls therefrom into the dipleg of the primary cyclone. From the dipleg, the catalyst returns back to the fluidized bed. The gaseous flow passed through the primary cyclone exits from cyclone via a riser to a secondary cyclone 4. Herein, the gas is cleaned free from the fines that are driven against the interior wall of the cyclone chamber and descend therefrom into the dipleg of the secondary cyclone. From the secondary cyclone, the gas flow is passed to a collection chamber, wherefrom it exits via a discharge conduit 5.

Now referring to FIG. 2, a regenerator 6 shown therein comprises a primary cyclone 8 and a secondary cyclone 13, both having a common distributor 7 for admission of air into the regenerator 6 and a discharge conduit 18 for passing the gas flow out from the secondary cyclone and thus entirely out from the regenerator. The primary cyclone comprises a space 9, in the interior, upper portion of the regenerator 6, limited by a center conduit 14 and a guide vane louver 10, and a chamber 11 and a dipleg 12 exiting at the lower portion of the chamber 11.

The secondary cyclone 13 forming the multiple-inlet-multicyclone is located inside the primary cyclone and comprises a center conduit 14 that at its upper portion converges into a gas discharge conduit 18. The gas flow, which exits the primary cyclone via the channel formed between the center conduit 14 and the inner wall of the primary cyclone dipleg 12 surrounding the same and which channel is continued as the channel formed between the inner wall of the center conduit 14 and the outer wall of the secondary cyclone dipleg 21, is passed from the primary cyclone to secondary cyclones 16A, 16B, 16C. The end portion of this passageway channel 15 is provided with guide vane louvers 17A, 17B, 17C via which the gas flow can be passed into separation chambers 19A, 19B, 19C. The guide vane louvers 17A–17C direct the gaseous mixtures flowing into the secondary cyclones into a swirling motion along the interior walls of the chambers 19A–19C. The multicyclone assemblies of the secondary cyclone also include downward from the chambers 19A–19C extending diplegs 20A–20C that exit into a common secondary cyclone dipleg 21 that is disposed in the interior of the primary cyclone dipleg 12. In the embodiment illustrated in FIG. 2, the channel 15 has a circular cross section. While this kind of circular channel cross section is advantageously suited for passing a mixture of solids with a gas flow, also passageways of a different cross section may be used as well.

According to the invention, the air passing through the distributor 7 keeps the catalyst contained in the regenerator 6 in a bubbling-bed state and introduces oxygen that is needed for the combustion reaction of coke. The gas with the entrained catalyst particulate solids rise into the upper portion of the regenerator and travel through the guide vane louver 10 to the space 9. The guide vane louver 10 puts the gaseous stream into a swirling motion, wherein the particulates are separated by centrifugal force onto the chamber wall 11 and descend therefrom into the primary cyclone dipleg 12. From the dipleg, the catalyst returns to the fluidized bed. The cleaner gas flow exiting the primary cyclone leaves the cyclone chamber via the center conduit 14, wherefrom it via the channel 15 that advantageously has a circular cross section further rises into the guide vane louvers 17A–17C of the secondary cyclones. Next, the fines are separated from the gas flow onto the walls of the chambers 19A–19C, wherefrom they descend into the secondary cyclone chamber diplegs 20A–20C. Via the secondary cyclone chamber diplegs 20A–20C, the fines descend into the common secondary cyclone dipleg 12 that as mentioned above is disposed into the interior of the primary cyclone dipleg 12. The gas flow passed through the secondary cyclone exits the cyclone and the entire reactor vessel via a discharge conduit 18.

Figure 3:
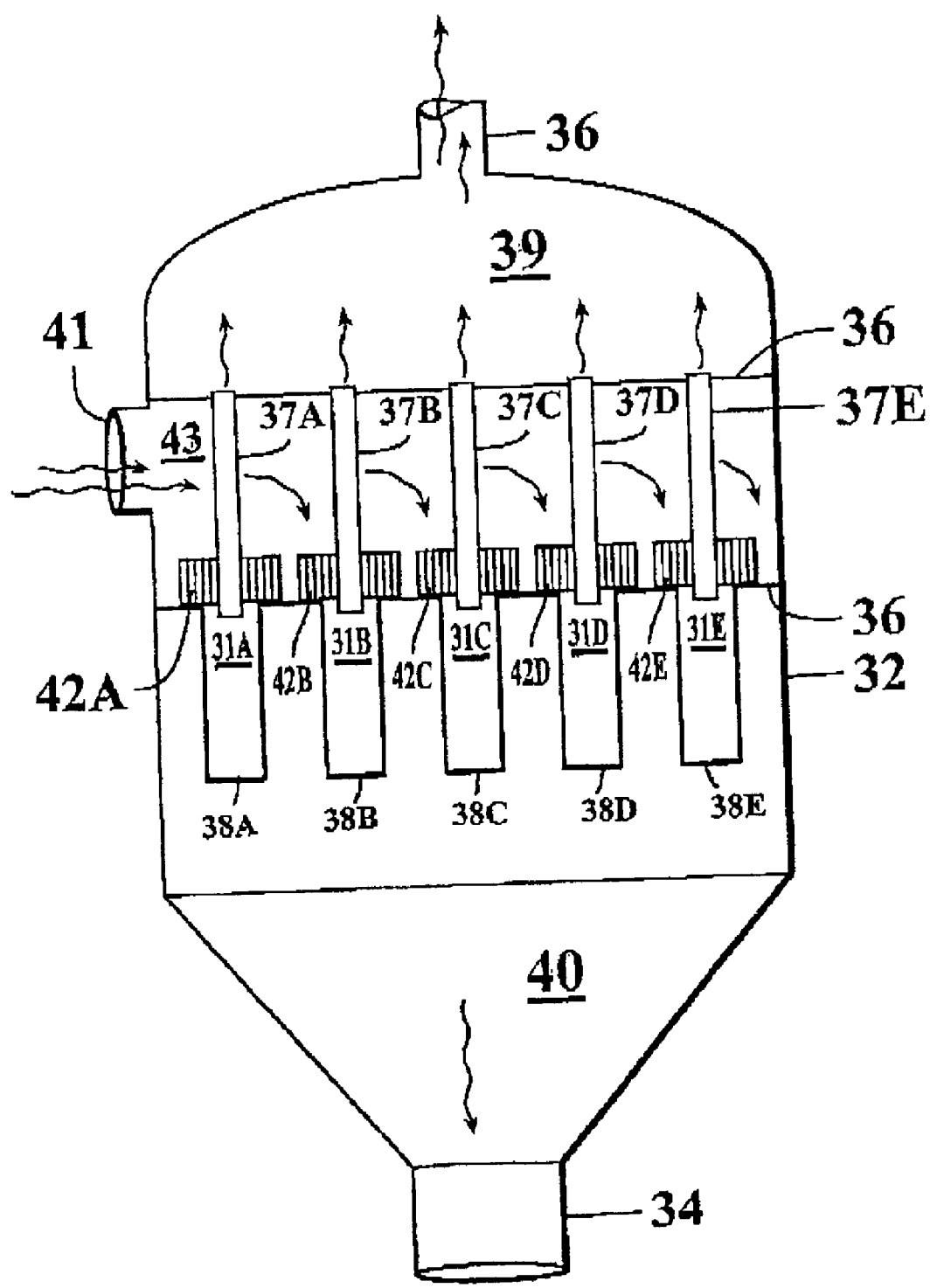
FIG. 3 shows a side view of the schematic structure of a multiple-inlet-multicyclone apparatus according to the invention adapted for use as a regenerator cyclone in the tertiary stage of an FCC unit.

In the solution of FIG. 3 the swirling motion is used to smooth the stream to the multicyclones. When the primary separator is a multi-inlet cyclone, the swirling motion is stored and the swirling motion smoothly channeled among the cyclones.

In FIG. 3 is shown a regenerator cyclone suited for use as the third-stage of an FCC unit. The embodiment of FIG. 2 is particularly suited for use as the tertiary cyclone. Herein, the multicyclone apparatus is mounted outside the pressure vessel of the FCC unit.

As to its basic construction, the multiple-inlet-multicyclone shown in FIG. 3 is similar to the secondary cyclone illustrated in FIG. 2. The parallel-operating multiple-inlet-multicyclones 31A, 31B, 31C, 31D and 31E are adapted into the interior of a common cyclone envelope 32. The upper portion of the separator apparatus is provided with a gas flow discharge conduit 33 and the lower portion of the apparatus has a discharge conduit 34 for separated particulates. Most advantageously, the center axis of the vessel is aligned upright. To the upper and middle portions of the vessel are adapted two partitions 35 and 36 that divide the vessel interior into three gas spaces. To the upper partition 35 are mounted the center conduits 37A–37E of the parallel-operating multiple-inlet-multicyclones so that the conduits exit into the upper space 39 of the cyclone. The center conduits extend through the upper partition 35 and have their exit ends reaching slightly above the upper level of the partition. In a similar fashion, to the lower partition 36 are mounted the diplegs 38A–38E of the multiple-inlet-multicyclones that exit into the lower space 40 of the cyclone. Said gas discharge conduit 33 communicates directly with the upper space 38 of the cyclone and, respectively, the solids discharge conduit 34 communicates with the lower space of the cyclone.

The partitions define a middle space 43 to which is mounted a feed pipe 41 passing through the envelope of the cyclone for feeding the gas to be cleaned into the middle space. The middle space communicates with the guide vane louvers 42A–42E of the multiple-inlet-multicyclones.

The solids-loaded gas stream passed through the feed pipe 41 flows through the middle space and the solids are transported along with the gas stream to the guide vane louvers 42A–42E of the multiple-inlet-multicyclones. The guide vanes put the gaseous stream into a swirling motion, wherein the particulates are separated by centrifugal force onto the walls of the conduits 31A–31E and descend therefrom into the diplegs 38A–38E of the multicyclones. From the diplegs, the catalyst particulates descend into the lower space 40 of the vessel, wherefrom they can be removed via the solids discharge conduit 34. The cleaned gas flow exits via the center conduits 37A–37E into the upper space 39 and leave the space via the gas discharge conduit 33.

When implemented as a modular apparatus, the multiple-inlet-multicyclone illustrated in FIG. 3 is suitable for retrofit installations in existing FCC processes when it is desirable to achieve a substantially lower level of dust emission. The apparatus is equally well adaptable to conventional cascaded cyclone systems as to separation systems equipped with multiple-inlet cyclones.

What is claimed is:

1. A method for separating particulate matter from a gaseous stream, the method comprising
    passing the gaseous stream containing the suspended particulates into a separator apparatus which includes at least two multiple-inlet-multicyclones and separating the particulates from the gas by centrifugal force,
wherein
    a separator apparatus is employed wherein at least two of the multiple-inlet cyclones, each equipped with a separation chamber, are adapted to operate in parallel so as to form a multiple-inlet-multicyclone apparatus, and wherein said multiple-inlet cyclones have straight guide vanes which are positioned outside of each of said separation chambers and serve to divide the gaseous stream into substreams so as to permit an accelerated gas flow velocity to be arranged individually for any one of said substreams.

2. The method according to claim 1, wherein the gaseous stream to be treated is flue gas discharged from a primary separator apparatus.

3. The method according to claim 2, wherein said primary separator apparatus comprises an axial cyclone or multiple-inlet cyclone or a cascaded cyclone configuration of the axial cyclone and multiple-inlet cyclone.

4. The method according to claim 1, wherein the gaseous stream to be treated is passed into said multiple-inlet-multicyclone apparatus from a secondary separator apparatus.

5. The method according to claim 4, wherein said secondary separator apparatus comprises an axial cyclone or multiple-inlet cyclone, a cascaded cyclone configuration of an axial cyclone and multiple-inlet cyclone or a combination of a multiple-inlet cyclone with a cascaded cyclone configuration.

6. The method according to any one of claims 1–5, wherein the gaseous stream to be treated is product gas which is discharged from fluidized catalytic process and contains suspended catalyst.

7. The method according to claim 1, wherein the gaseous stream to be treated is flue gas which is discharged from the combustion of coke performed in catalyst regeneration and hence contains suspended catalyst.

8. The method according to claim 6, wherein said fluidized catalytic process comprises catalytic cracking of hydrocarbon compounds performed in a fluidized catalytic cracking unit.

9. The method according to claim 1, wherein the stream to be treated is flue gas from a fluidized-bed combustion process of solid fuels performed in heat or power generation.

10. The method according to claim 1, wherein the dust concentration of the gaseous stream being treated is reduced to a value not greater than 50 mg/Nm$^3$.

11. The method according to claim 1, wherein the separation of particulate matter is earned out using 3 to 25 parallel-connected cyclones.

12. The method according to claim 11, wherein 3 to 25 parallel-connected cyclones in an arrangement, wherein the diplegs of the parallel-connected cyclones are adapted into the interior of a common discharge conduit.

13. An assembly for separation of particulate matter from a gaseous stream in process equipment, the assembly comprising
    at least two multiple-inlet cyclones,
characterized by
having at least two of the multiple-inlet cyclones connected in a parallel configuration, each equipped with a separation chamber, wherein said multiple-inlet cyclones have straight guide vanes on the outside of each of said separation chambers serving to divide the gaseous stream into substreams so as to permit an accelerated gas flow velocity to be arranged individually for any one of said substreams.

14. The assembly according to claim 13, wherein said parallel-connected cyclones have a common gas inlet channel formed between two concentric cylindrical or partially conical envelope surfaces, whereby said cyclones are adapted to operate in the interior space of said gas inlet channel.

15. The assembly according to claim 14, wherein said gas inlet channel has an essentially circular cross section in a plane perpendicular to the center axis of the cyclone.

16. The assembly according to claim 13, wherein the center conduits of said multiple-inlet cyclones are adapted to pass through a common gas inlet channel.

17. The assembly according to claim 13, wherein said separation chamber has a center axis which is aligned essentially upright.

18. The assembly according to claim 13, wherein the number of said parallel-connected multiple-inlet cyclones is 3 to 300.

19. The assembly according to claim 13, wherein said assembly is connected to a fluidized catalytic process apparatus or process equipment used in fluidized-bed combustion.

* * * * *